United States Patent [19]
Marino et al.

[11] Patent Number: 5,737,288
[45] Date of Patent: Apr. 7, 1998

[54] POSITION SENSING FOR AN OPTICAL RECORDING ACTUATOR

[75] Inventors: Philip F. Marino; Charles J. Simpson, both of Rochester, N.Y.

[73] Assignee: Eastman Kodak Company, Rochester, N.Y.

[21] Appl. No.: 660,568

[22] Filed: Jun. 7, 1996

[51] Int. Cl.⁶ .................................................... G11B 7/095
[52] U.S. Cl. ........................................ 369/44.32; 369/54
[58] Field of Search ............................ 369/44.11, 44.14, 369/44.23–44.24, 44.32, 54, 58; 250/201.1, 201.5, 208.1–208.2

[56] References Cited

U.S. PATENT DOCUMENTS

| | | | |
|---|---|---|---|
| 5,321,678 | 6/1994 | Takishima et al. | 369/44.14 |
| 5,347,503 | 9/1994 | Koyama et al. | 369/44.32 |
| 5,455,811 | 10/1995 | Tanaka | 369/44.14 |
| 5,504,724 | 4/1996 | Yang | 369/44.24 |

*Primary Examiner*—W. R. Young
*Attorney, Agent, or Firm*—Raymond L. Owens

[57] ABSTRACT

An optical recording actuator is disclosed and includes a base and a moveable actuator lens holder having its position controlled between two to six degrees of freedom of motion. Such lens holder including an objective lens. The actuator further includes a sensing system a light source and three sensors and mounted on the moveable lens holder three separate plates, each corresponding to a sensor and having an aperture and arranged so that light from the source passes through the aperture of each plate and illuminates its corresponding sensor mounted on the base. Each sensor includes an arrangement for providing position detection in two orthogonal directions and a microprocessor responsive to the position detection to determine the position of the moveable lens holder with respect to the base in six degrees of freedom of motion.

4 Claims, 6 Drawing Sheets

FIG. 4

$$T = \begin{bmatrix}
-\frac{1}{2}-\frac{b}{d} & 0 & 0 & 0 & -\frac{b}{((-b+a)-c)} & 0 \\
0 & \frac{a}{c} & 0 & 0 & \frac{a}{(-b+a)} & 0 \\
0 & 0 & \frac{a}{c} & 0 & 0 & 0 \\
-\frac{1}{(2-d)} & 0 & 0 & -\frac{1}{c} & 0 & 0 \\
0 & 0 & 0 & 0 & \frac{1}{(2-d)} & 0 \\
-\frac{1}{2}-\frac{b}{((-b+a)-c)} & -\frac{1}{c}-\frac{1}{(-b+a)} & 0 & 0 & -\frac{1}{2}-\frac{b}{((-b+a)-c)} & \frac{1}{2}-\frac{b}{d}
\end{bmatrix}$$

POSITION SENSING FOR AN OPTICAL RECORDING ACTUATOR

FIELD OF THE INVENTION

The present invention relates to optical recording actuators and, more particularly, to sensing and controlling actuator with multiple degrees of freedom of motion.

BACKGROUND OF THE INVENTION

Focus/tracking actuators are used in optical disc recording and reading devices to control the lens position relative to the rotating disc. This is necessary because of unavoidable warp of the disc, spindle errors, and other mechanical and optical imperfections. Both focus (controlled by the distance between the lens and the disc surface) and tracking (the correct radial position of the lens so as to read or write a single track at a time) must be maintained. The motions of the actuator are controlled by a servo system.

Current actuators may include a tracking position sensor, which typically consists of a fixed light source, a flag or slot which moves with the actuator in the tracking direction, and an optical sensing array (often a split optical detector). The information supplied by this detector system—the absolute tracking position of the actuator with respect to its base—is used to improve the performance of a writer controller which includes a tracking servo system. It particularly allows for efficient control of the tracking access carriage or access system, which moves the entire actuator radially across the disc to allow reading and writing across the entire disc surface.

U.S. patent application Ser. No. 08/412,487 filed Mar. 28, 1995, now abandoned, to Philip F. Marino and Charles J. Simpson, the disclosure of which is incorporated herein by reference, describes a sensor which simultaneously measures tracking position and roll angle motion of an actuator. When used with an actuator motor which can control roll, this sensor can supply input roll motion information to a roll control servo, thus improving the actuator performance and easing manufacturing and assembly tolerances. However, in order to monitor other motions with this sensor, for example: pitch rotation and focus position, two or more sensor assemblies would be required.

SUMMARY OF THE INVENTION

It is an object of the present invention to provide improved sensing and computing arrangements which can be used to determine between two to six degrees of freedom of motion.

This object is achieved by an optical recording actuator comprising:
a) a base;
b) a moveable lens holder having its position controlled between two to six degrees of freedom of motion, such assembly including an objective lens;
c) a sensor assembly including mounted on the base a light source and three sensors and mounted on the moveable lens holder, means defining three separate apertures, each corresponding to a sensor and arranged so that light from the source passes through the apertures and illuminates its corresponding sensor mounted on the base, each sensor having:
  i) means for providing position detection in two orthogonal directions; and
d) computing means responsive to the position detection means to determine the position of the moveable actuator with respect to the base in six degrees of freedom of motion.

ADVANTAGES

Actuators in accordance with the present invention can provide signals which represent all six degrees of freedom of motion with a single light source and a compact configuration requiring access to only one surface of the actuator. Data provided by these sensors can be used to control not only the actuator position, but also the laser power control servo (actuator tilt reduces spot quality on the disk and therefore can be partially compensated for by an increase in write power). These sensor provided signals can be used in diagnostics for determining the operability of actuator parts.

The present invention also has the advantage relative to a disk-sensing tilt sensor in that it operates in the absence of a disk, so that alignment can be maintained during disk loads and disk spinup.

BRIEF DESCRIPTION OF THE DRAWINGS

FIG. 4 shows a matrix T which is used to convert spot motions Ay through Cz to lens holder motions relative to the base in six degrees of freedom.

DETAILED DESCRIPTION OF THE INVENTION

Figure 1:
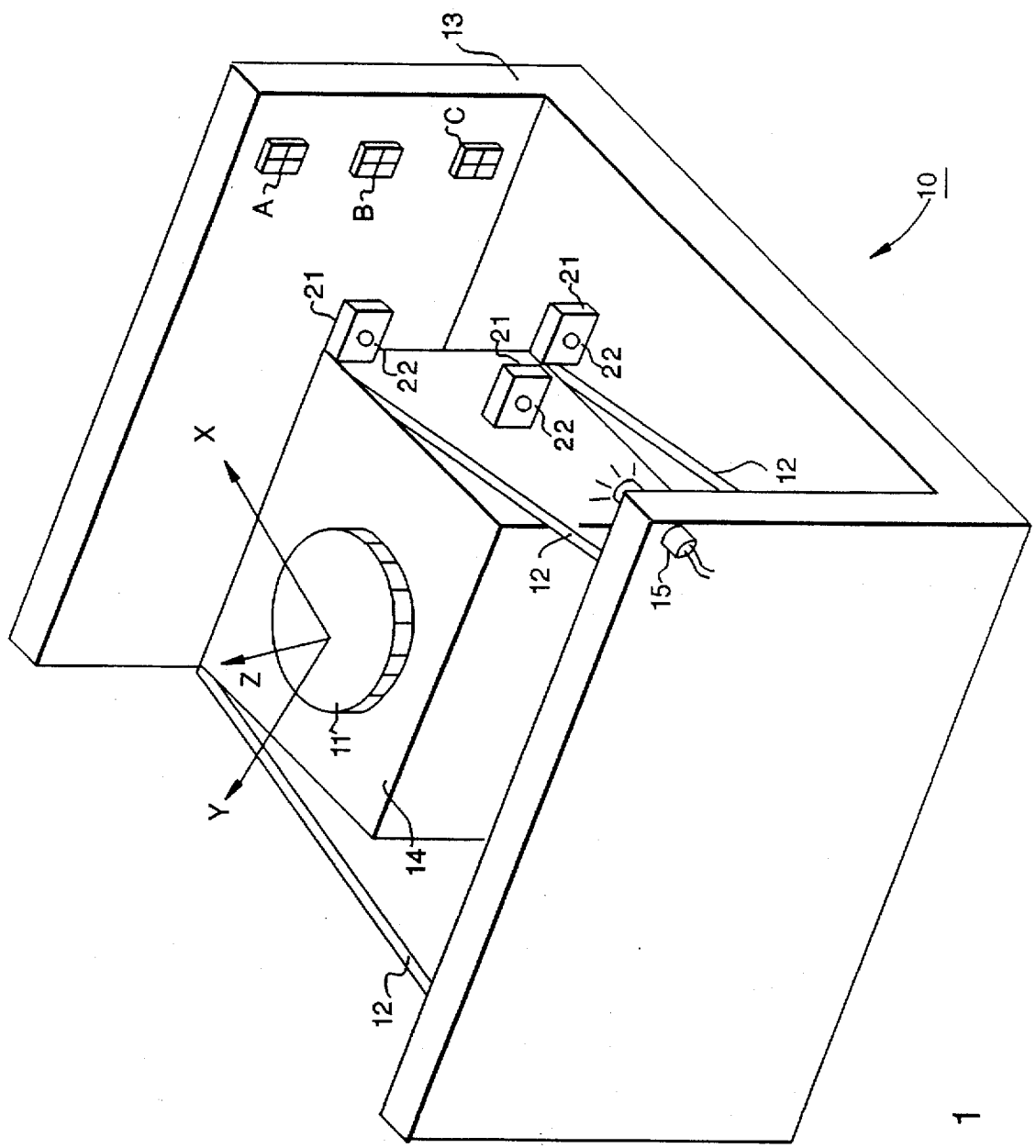
FIG. 1 is a schematic of an actuator in accordance with the present invention.

FIG. 1 shows a six degree of freedom sensor on a conventional moving coil, four flexure actuator. This sensor (including the algorithm and computing means) provides continuous sensing of all six degrees of freedom of absolute motion of the actuator. The error signals from this sensor can be used as servo inputs to correct actuator tilt in the roll and or pitch direction, if the actuator motor(s) can control the roll and pitch motions of the actuator. An example of such a motor system is given in U.S. Provisional application Ser. No. 60/005,396 filed Oct. 6, 1995 to Philip F. Marino, Charles J. Simpson, and Paul D. Heppner, the disclosure of which is incorporated herein by reference. This sensor can also supply absolute tracking position information, thereby replacing existing tracking position sensors. In addition, data about the other five degrees of freedom of motion of the actuator are supplied. The absolute focus position data can be used, for example, by the servo system to improve focus capture and to allow positioning of the actuator in the focus direction without a disc present.

For purposes of this disclosure, the term six degree of freedom of motion means the translation of an lens holder with respect to the base in three orthogonal axes and the rotation of the device around these axes.

Referring to FIG. 1, a schematic of an optical actuator 10 in accordance with this invention is shown. This optical actuator 10 includes an objective lens 11 which is well known in the art focuses a laser light beam (not shown) on a surface of a disk member (not shown), a lens holder 14 to which the objective lens is mounted with adhesive, and flexures 12 fixed to the lens mount and a base 13 and which support the lens holder 14 relative to the base 13. The objective lens 11 is mounted to the lens holder 14 with adhesive. A sensor system is shown to include a single light source 15 fixed to the actuator base 13, such as a light emitting diode, three apertures 22 are formed in three aperture plates 21 which are fixed to the lens holder 14, and three quad-cell photodetectors A, B, and C, which are fixed to the actuator base 13. Alternatively, the apertures could be formed directly in the lens holder. As another alternative, the LED 15 and quad photosensitive detectors A, B, and C could be fixed to the lens holder 14, and the three aperture plates 21 and three apertures 22 could be fixed to the actuator base 13. The apertures 22 are preferably simple open holes through which light can pass. As an alternative, however, lenses or other optical devices can be located within the apertures. As well know to those skilled in the art, the lens holder 14 is controlled by a servo system not shown. The optical actuator 10 is, of course, mounted on a movable carriage. These elements have not been shown for clarity of discussion.

The light from the LED 15 passes though the three apertures 21 and illuminates the three quad photosensitive detectors A, B, and C. The information extracted from the detectors A, B, and C is used to calculate the motion of the lens holder 14 and objective lens 11 in all six degrees of freedom relative to the base 13. As noted above, these six degrees of freedom are: translation in each of the three axes, and rotation about each of the three axes.

Figure 2A:
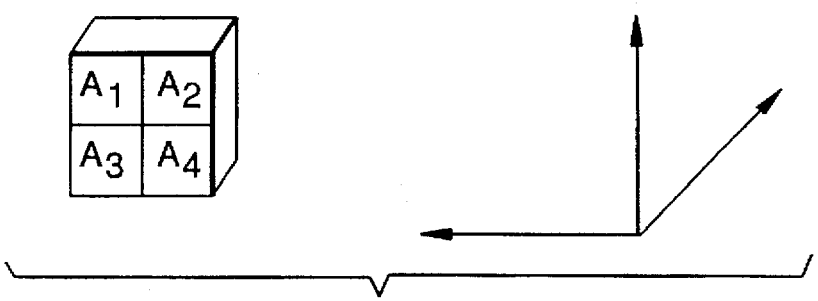
FIGS. 2A–2C show three separate quad sensors which are used in the actuator of FIG. 1.
Figure 2B:
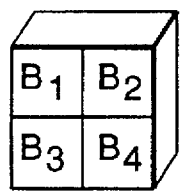
Figure 2C:
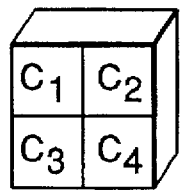

FIG. 2 shows the quad photosensitive detectors A, B, and C. Sensor A comprises four sensor sectors A1, A2, A3, and A4. Sensor B comprises four sensor sectors B1, B2, B3, and B4. Sensor C comprises four sensor sectors C1, C2, C3, and C4. Ay, Az, By, Bz, Cy, and Cz represent the motions of the illuminated spots on the three quad photosensitive detectors A, B, and C. These motion values are based on the intensity signals from the 12 independent sensor sectors, that comprise the three quad cells and are computed as follows:

$$Ay = k1[(A1+A3)-(A2+A4)]/(A1+A2+A3+A4)$$

$$Az = k2[(A1+A2)-(A3+A4)]/(A1+A2+A3+A4)$$

$$By = k3[(B1+B3)-(B2+B4)]/(B1+B2+B3+B4)$$

$$Bz = k4[(B1+B2)-(B3+B4)]/(B1+B2+B3+B4)$$

$$Cy = k5[(C1+C3)-(C2+C4)]/(C1+C2+C3+C4)$$

$$Cz = k6[(C1+C2)-(C3+C4)]/(C1+C2+C3+C4)$$

The value of K (a constant) for each of these calculations can be derived analytically or experimentally.

Figure 3:
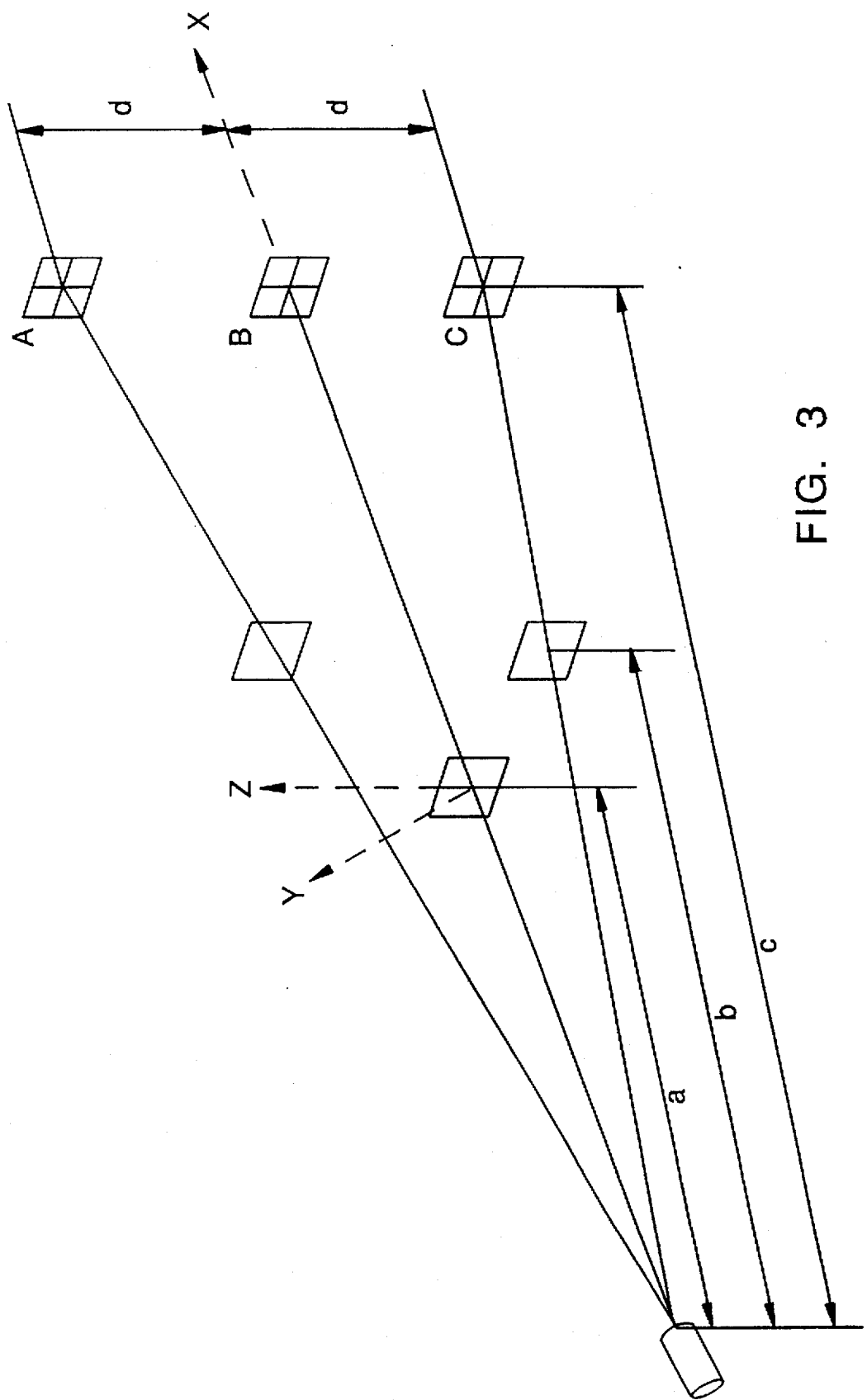
FIG. 3 shows specific sensor to actuator geometry which is necessary to understand the computation of the degrees of freedom of motion of the lens holder.

FIG. 3 shows the geometry of the sensing system and shows three axes. Important dimensions and spacings are labeled. The operation of the sensing system or in determining all six degrees of freedom of motion of the lens holder requires that dimension "a" be substantially unequal to dimension "b." Although in FIG. 3 dimension "b" is shown to be greater than dimension "a", the alternative arrangement, where dimension "a" is substantially greater than dimension "b", would function as well. It is also required that dimension c be substantially greater than either dimension "a" or "b". An additional requirement is that both dimensions "d" be substantially greater than 0.0, although they need not be the same.

FIG. 4 is a conversion matrix T which transforms the six spot motions Ax through Cz into lens holder motions. This conversion matrix T is derived based on the dimensions "a", "b", "c", and "d." As will be seen, a microprocessor uses this matrix to make these calculations. To calculate the six degrees of freedom of motion of the lens holder 14 relative to the base 13, the vector of the six detector motions: Ay through Cz, are premultiplied by the conversion matrix T. This calculation is calculated in real time by the microprocessor which typically can done at a high rate such as 10,000 to 100,000 times per second so that the lens holder motion data would be available for servo control purposes. Although the matrix T has been shown to calculate freedom of motion of the lens holder 14 relative to the base 13, it can clearly be used to calculate anywhere between 2 to 6 degrees of motion of the lens holder 14.

Figures 5, 5A:
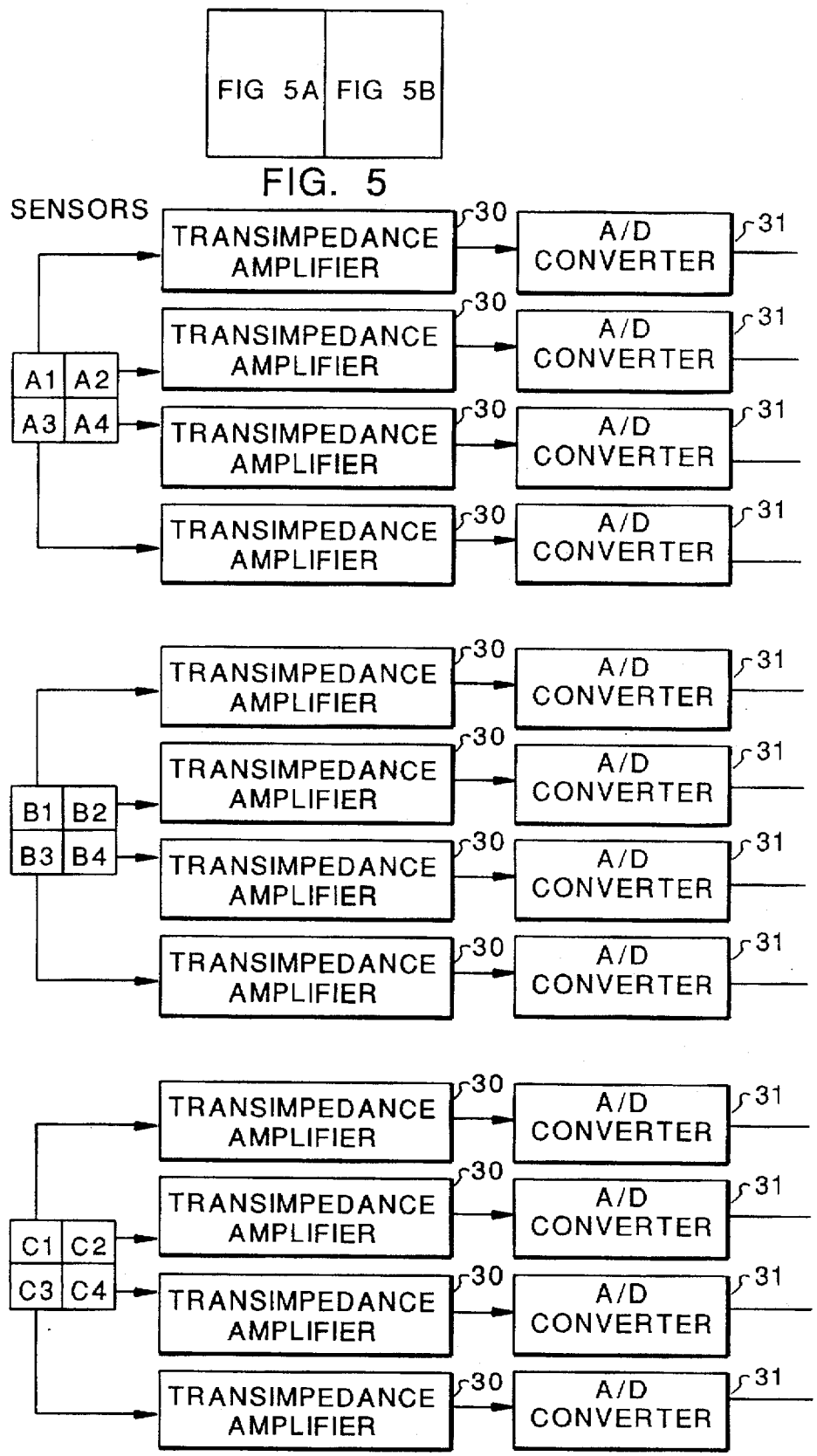
FIGS. 5, 5A, and 5B show block diagram of a computational system for the actuator of FIG. 1 which computes the degrees of freedom of motion of the lens holder.
Figure 5B:
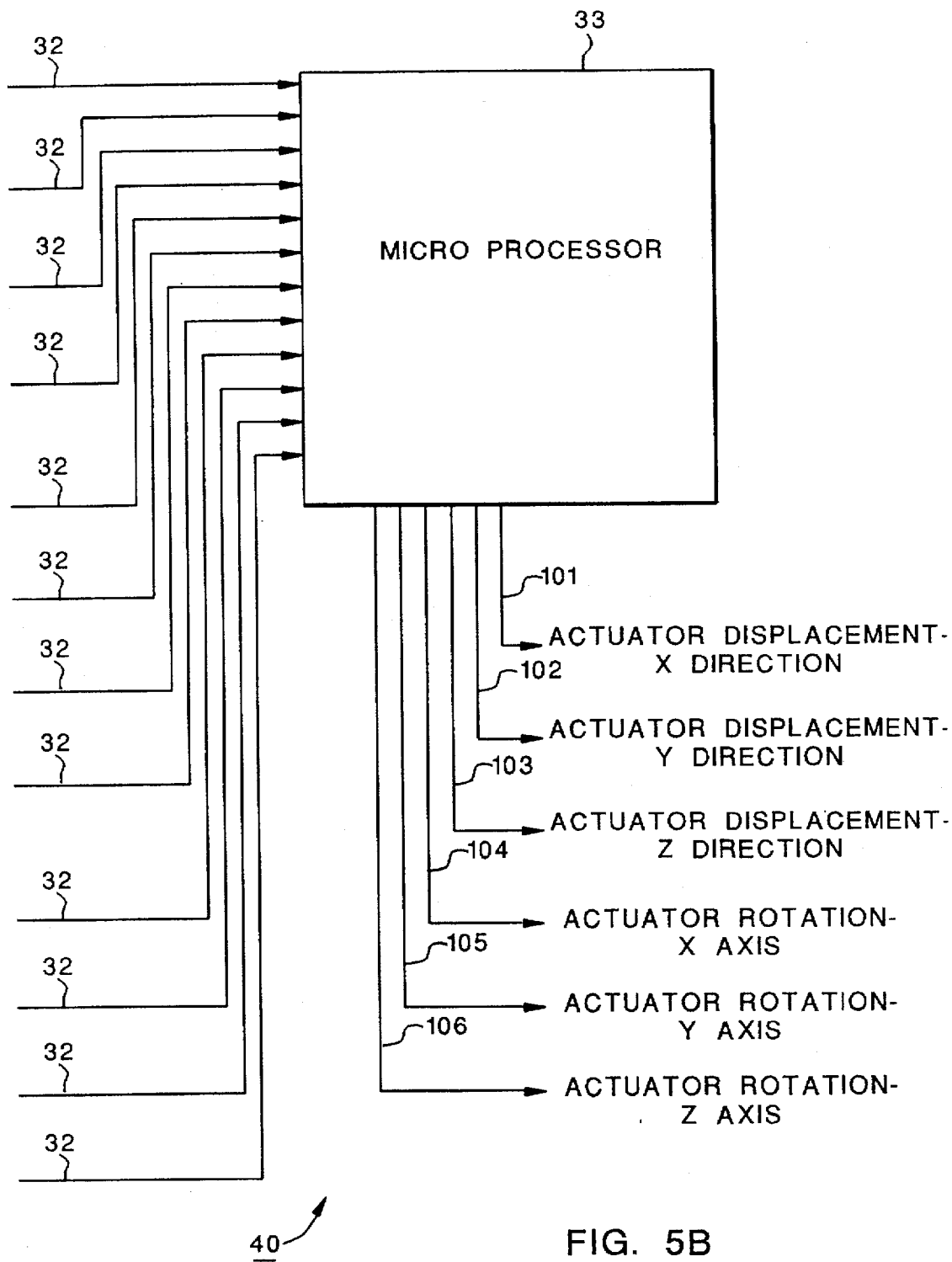

FIG. 5 shows a computational system 40 which produces signals which represent the six degrees of freedom of motion of the lens holder 14 relative to the base 13. The intensity signals from the 12 sensor sectors A1, A2, A3, A4, B1, B2, B3, B4, C1, C2, C3, and C4 are processed by the transimpedance amplifiers 30, which are conventional components. Conventional A/D converters 31 convert the amplified intensity signals produced by the transimpedance amplifiers 30 into digital intensity signals 32. The digital intensity signals 32 are then provided as inputs to the conventional microprocessor 33. The microprocessor 33 calculates the six spot motions Ax through Cz according to above described equations and then uses these six values to then calculate the six degrees of freedom of motion of the lens holder 101, 102, 103, 104, 105 and 106 by premultiplying these spot motions by the conversion matrix T. Digital signals 101, 102, 103, 104, 105, and 106 are, as will be understood to those skilled in the art, applied to a writer controller which controls a servo system which controls the lens holder 14 and the carriage which mounts the optical actuator. Those skilled in the art will recognize that other conventional computational components can be used to perform the signal processing and calculations.

The invention has been described in detail with particular reference to a certain preferred embodiment thereof, but it will be understood that variations and modifications can be effected within the spirit and scope of the invention.

| Parts List | |
| --- | --- |
| 10 | optical recording actuator |
| 11 | objective lens |
| 12 | flexures |
| 13 | actuator base |
| 14 | lens holder |
| 15 | light emitting diode |
| 21 | aperture plate |
| 22 | aperture |
| 30 | transimpedance amplifier |
| 31 | A/D converters |
| 32 | digital intensity signals |
| 33 | microprocessor |
| 40 | computational system |
| A | quad photo-sensitive detector |
| B | quad photo-sensitive detector |
| C | quad photo-sensitive detector |
| T | conversion matrix |

We claim:

1. An optical recording actuator comprising:
   a) a base;
   b) a moveable lens holder having its position controlled between two to six degrees of freedom of motion, such lens holder including an objective lens;
   c) a sensor assembly including mounted on the base a light source and three sensors and mounted on the moveable lens holder, means defining three separate apertures, each corresponding to a sensor and arranged so that light from the source passes through the apertures and illuminates its corresponding sensor mounted on the base, each sensor having:
  i) means for providing position detection in two orthogonal directions; and
d) computing means responsive to the position detection means to determine the position of the moveable lens holder with respect to the base in six degrees of freedom of motion.

2. An optical recording actuator comprising:
a) a base;
b) a moveable lens holder having its position controlled between two to six degrees of freedom of motion, such lens holder including an objective lens;
c) sensor means including mounted on the base a light source and three sensors and mounted on the moveable lens holder three separate plates, each corresponding to a sensor and having an aperture and arranged so that light from the source passes through the aperture of each plate and illuminates its corresponding sensor mounted on the base, each sensor having:
  i) four independent photosensitive elements, each providing a separate output signal; and
d) computing means responsive to each output signal of the photosensitive elements to determine the position of the moveable lens holder with respect to the base in six degrees of freedom of motion.

3. The optical recording actuator of claim 2 wherein the computing means comprises means for digitizing each of the output signals and a microprocessor responsive to the digitized output signals for calculating the six degrees of freedom of motion of the lens holder relative to the base.

4. The optical recording actuator of claim 3 wherein the sensor means includes four independent quad photosensitive elements, each providing a separate output signal.

* * * * *